(12) United States Patent
Ou et al.

(10) Patent No.: US 9,497,120 B1
(45) Date of Patent: Nov. 15, 2016

(54) AUTOMATED TOP-DOWN MULTI-ABSTRACTION INFRASTRUCTURE PERFORMANCE ANALYTICS-NETWORK INFRASTRUCTURE-AS-A-SERVICE

(75) Inventors: Chao-Wei Ou, Poughkeepsie, NY (US); Prasanna S. Patil, Elmsford, NY (US); Steve J. Song, South Salem, NY (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 1594 days.

(21) Appl. No.: 12/751,058

(22) Filed: Mar. 31, 2010

(51) Int. Cl.
*H04L 12/26* (2006.01)
*H04L 12/801* (2013.01)
*H04W 24/02* (2009.01)

(52) U.S. Cl.
CPC ............. *H04L 47/11* (2013.01); *H04W 24/02* (2013.01)

(58) Field of Classification Search
USPC ............ 370/216–228, 241–253; 714/1, 2, 25
See application file for complete search history.

(56) References Cited

U.S. PATENT DOCUMENTS

| | | | |
|---|---|---|---|
| 7,543,057 B1* | 6/2009 | Cahn | 709/224 |
| 7,738,372 B2* | 6/2010 | Elmasry et al. | 370/231 |
| 2008/0170854 A1* | 7/2008 | Li | 398/45 |
| 2011/0292832 A1* | 12/2011 | Bottari et al. | 370/254 |
| 2011/0299388 A1* | 12/2011 | Wu et al. | 370/228 |

* cited by examiner

*Primary Examiner* — Luat Phung
(74) *Attorney, Agent, or Firm* — Krishnendu Gupta; Joseph D'Angelo

(57) ABSTRACT

A method, system, and program, product for analyzing a computer network comprising one or more domains, each of the one or more domains comprising a plurality of nodes and one or more links, the method comprising calculating the health of the computer network, determining, based on the computer network health, if an infrastructure problem exists, identifying, based on the determination, a domain of the one or more domains of the computer network, further identifying, based on the identified domain, an infrastructure problem selected from the group comprising the plurality of nodes and the one or more links of the identified domain, determining an origin of the cause of the infrastructure problem based on the identified infrastructure problem.

20 Claims, 8 Drawing Sheets

AUTOMATED TOP-DOWN MULTI-ABSTRACTION INFRASTRUCTURE PERFORMANCE ANALYTICS-NETWORK INFRASTRUCTURE-AS-A-SERVICE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to analyzing a computer network.

BACKGROUND

Network management is an actively pursued field of endeavor requiring skilled persons with detailed knowledge of network operation. Whether constructing new networks, or adapting or maintaining existing networks, the skills of the operating personnel are needed to provide efficient and cost-effective networks that satisfy specific operating conditions that may be provided in a service level agreement (SLA). Typically, SLA represents criteria such as quality of service (QoS), response time, guaranteed network up-time, etc.

A network architect must balance the number, location, and type of hardware and software that must be deployed to satisfy a specific higher level operating condition; too much equipment and the desired operating conditions are satisfied, but at a cost for purchase and maintenance of equipment; while too little equipment may fail to satisfy certain ones of the operating conditions. Alternatively, just the right amount of equipment may satisfy the desired operating condition when the network is fully operating, but may fail to provide sufficient support when one or more equipments fail or are operating at levels for which they are not designed. Such trading cost of the network infrastructure for overall network performance is a skill that is expensive for companies to retain and for persons to maintain. An incorrect trade-off can result in costing the network owner a significant expense, in dollars, for having too much capability or the expense, in business relationships, of having too little capability.

Even with the best analysis, simulation and/or experience, the network may experience increases, or bursts of data flow, which are beyond the expected and designed capability of the system. In this case, the observed performance of a service may be significantly degraded as bottlenecks are created in the network. These bottlenecks may be caused by one or more network hardware or software element(s) or component(s) operating at conditions beyond their capability.

In some cases, the bottlenecks, once identified, may be corrected by the introduction of additional supporting hardware or software, providing new data path and or reducing access to the network. However, reducing access to the network merely increases the delay in the system perceived by new users and fails to correct the conditions causing the bottleneck and providing new data path may not be practical as the communications links may be fixed.

Hence, there is a need in the industry for a method and apparatus for determining factors contributing to degradation and providing appropriate measures to correct the degradation before network performance degradation is observed.

SUMMARY

A method, system, and program, product for analyzing a computer network comprising one or more domains, each of the one or more domains comprising a plurality of nodes and one or more links, the method comprising calculating the health of the computer network, determining, based on the computer network health, if an infrastructure problem exists, identifying, based on the determination, a domain of the one or more domains of the computer network, further identifying, based on the identified domain, an infrastructure problem selected from the group comprising the plurality of nodes and the one or more links of the identified domain, determining an origin of the cause of the infrastructure problem based on the identified infrastructure problem.

DETAILED DESCRIPTION

Figure 1:
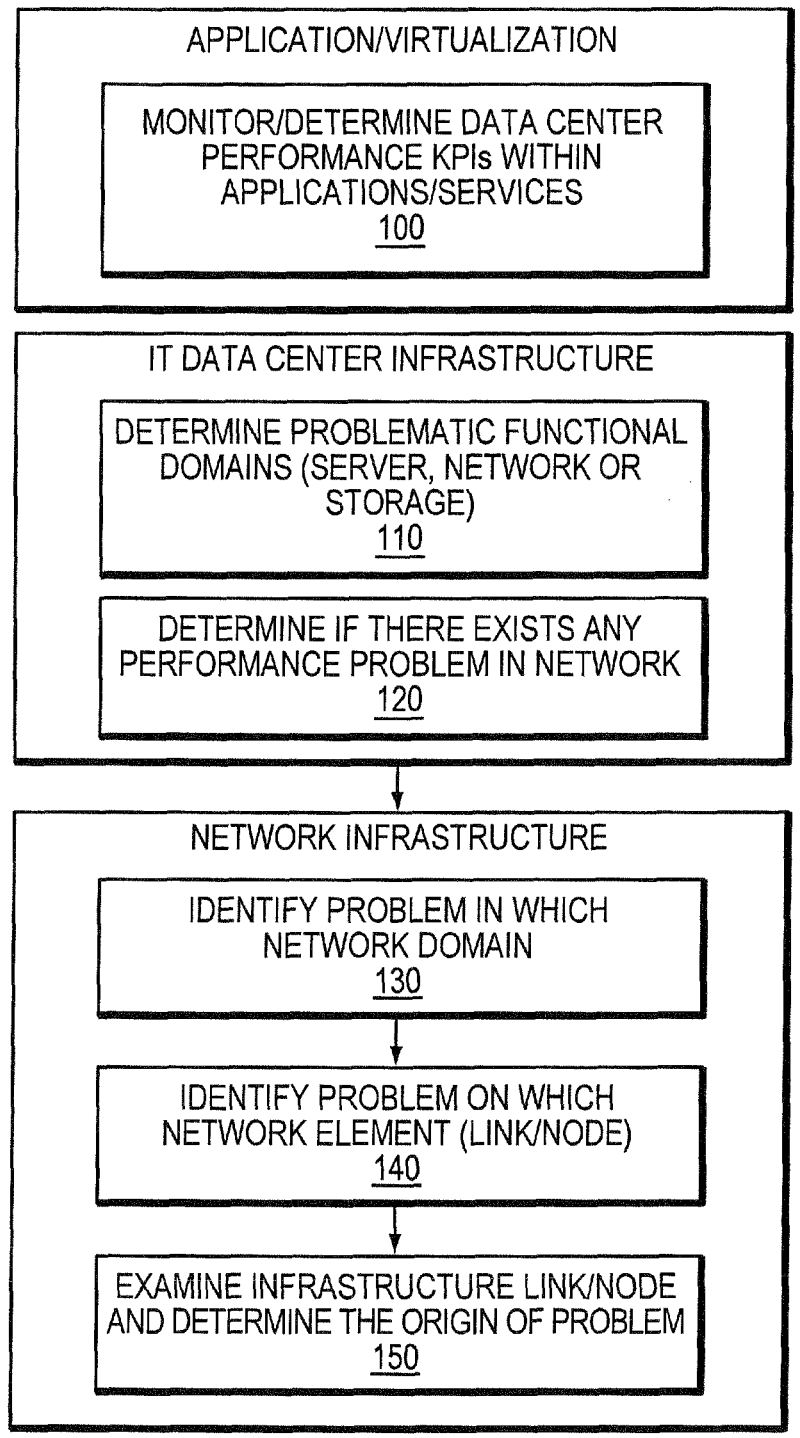
FIG. 1 shows an embodiment of a simplified method of the current invention.

Typically, current performance management solutions focus on collecting performance metrics and comparing them against historical behavior, which is commonly referred to as dynamic baseline. Most conventional methods treat collected metrics as uncorrelated and try to establish the relationship between them either through grouping by understanding the topology, mathematical regression algorithms or some kind of intelligent mechanisms. Usually, these solutions are designed to address general performance problems instead of being optimized specific to IT Data Center infrastructure, which commonly consists of server, network and storage domains.

Furthermore, these solutions typically alert of a performance problem on an element in a domain but may not pinpoint the origin of performance problems (i.e. the element which may be causing the performance problem on other nearby elements) or the true root causes (i.e., faulty element, mis-configuration, traffic behavior change due to rerouting).

Dynamic baseline techniques may be used in performance management and is often referred to as smart baseline. This type of baseline techniques may conclude a desired behavior model of an element based on a series of computations on historical data collected for a metric or a set of metrics. A simple example of dynamic baseline may be the standard deviation over a series of historical sampled data.

In an embodiment of the current invention, infrastructure performance analytics based on the traffic of a network to determine the health of a network element (a network element may be a connection as link or a device as node), a set of network elements or the whole network may be provided to data center users and operators. The analytics may be designed to answer a series of user/operation questions from networking infrastructure-as-a-service perspective when performance problems occur. The performance problems may include a determination of whether a problem exists, which functional domain (e.g., server, network and storage) may have the performance problem, if it is network problem, which network is exhibiting the problem, and what element may be associated with the problem. If the problem is not in a network, it may be hard to pinpoint the origin of the performance problem. By observing performance metrics collected on the network elements located on the edge of network adjacent to other domain conjunction with performance metrics collected on adjacent domain elements (i.e. a host or a storage device), the problem origin may be able to be identified across multiple domains.

In an embodiment of the current invention, the network may be considered as and analyzed as a transportation medium. That is, in some embodiments, the network is the center of IT Data Center infrastructure, and the network nodes (i.e., switch and router) may not be considered as the origin or destination of user data. Rather, in certain embodiments, user data may enter the network at point A and may exit the network at point B allowing the network may be analyzed as a transport medium. An embodiment of the current invention presents an analysis of the network based on a transport type view of the network, where the health of the network may be based on the network's ability to transport data instead of counting problematic elements either in performance or fault. In certain embodiments, the health or ability to transport data may be a function of the health of the links and nodes that make up the network.

In some embodiments of the current invention, the origin of a performance problem may be diagnosed by examining the health of the overall network to identify if an infrastructure problem exists, given a problem, identifying the domain of the infrastructure problem, identifying the links or nodes associated with the infrastructure problem, and using the identified links or nodes to determine an origin for the problem.

Figure 2:
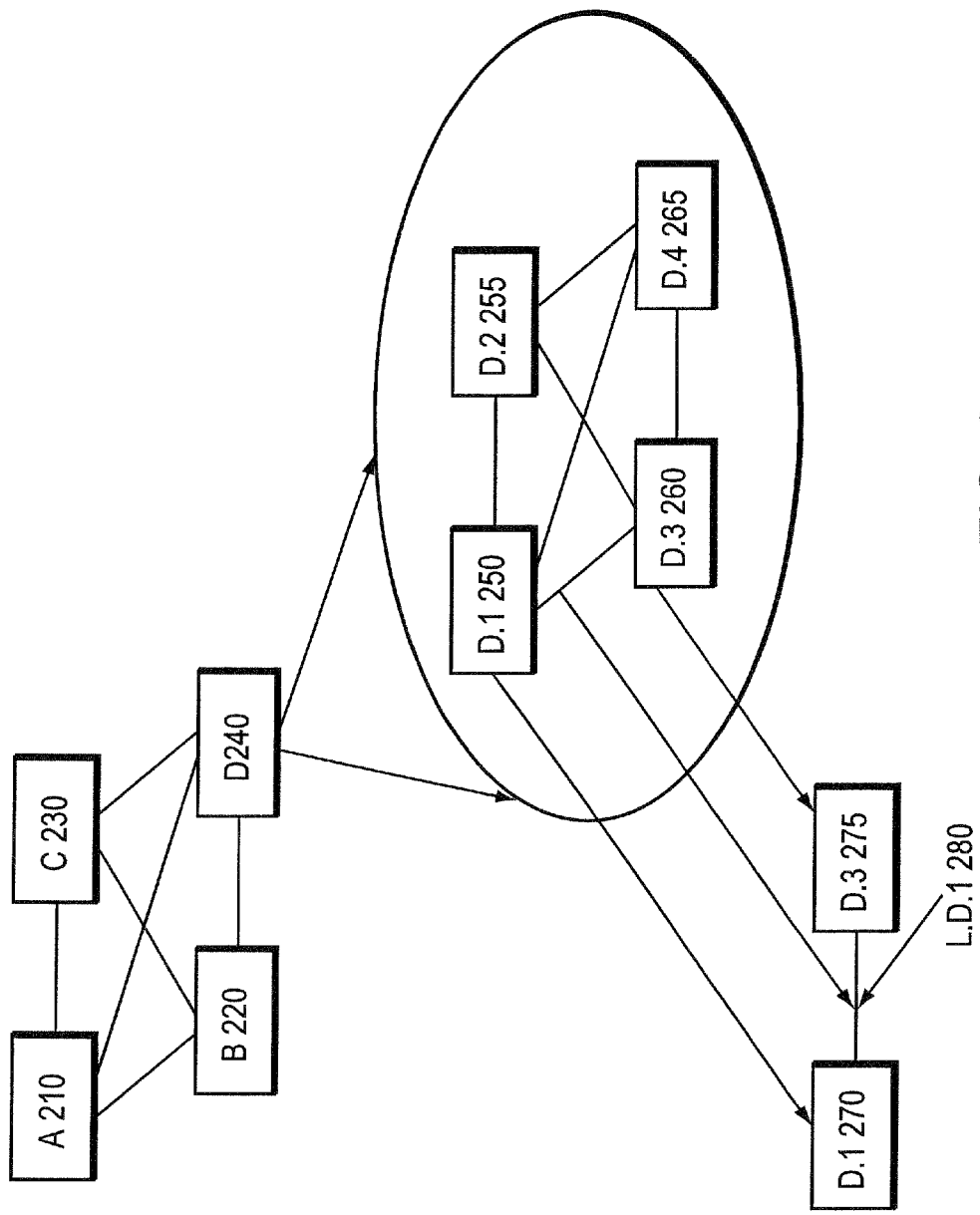
FIG. 2 shows a simplified embodiment of a network of the current invention.

For example, refer to the embodiments of FIG. 1 and FIG. 2. In FIG. 1, it is shown that IT infrastructure performance management can be delivered separately from application/service performance management to IT Data Center operators. As well, combining application and infrastructure performance analysis results may deliver performance management value to IT Data Center users and operators by understanding the cause of the performance problems and impacted applications/services. Further, the combining analysis results may significantly reduce IT Data Center maintenance cost and MTTR (Mean Time To Repair).

In the embodiment of FIG. 2, a network, such as domains A 210, B 220, C 230, and D 240, may be monitored for key performance indicators (KPIs) and based on those KPIs the performance of Data Center may be determined 100 within applications/services; which may often be measured by SLA (Service Level Agreement) with proper application/service transaction monitoring tools. This may provide a consumer's view of the IT Data Center availability and performance. In this embodiment, a determination 110 may be made of the performance problem existing in an infrastructure functional domain and a determination 120 is made of the health of the network infrastructure, such as the infrastructure consisting of domains A 210, B 220, C 230, and D 240.

Based on the health, a problem in the network domain may be identified 130 and maybe traced to a particular domain, such as domain D 240. In domain D 240, there may be a series of nodes and links, such as nodes D.1 250, D.2 255, D.3 260, and D.4 265. From the infrastructure, it may be identified 140 on which link or infrastructure the problem exists, for example as between D.1 250 and D.3 275 as connected by link 280. Given a node or link, the node or link may be examined 150 to determine the origin of the problem. For example L.D.1 280 may not be functional, or D.1 270 may have its resources being used at a very high rate.

In an embodiment of the current invention, the health of the network may be determined by examining the health of the links and nodes in the network. Problems may be identified by examining the health of the network overall, then examining the links and nodes that are causing the problems in the network. After identifying the nodes or links, for non-failure causes (e.g., exceeding node/link capacity) of the performance problem may be determined local to the problematic node/link. For network failure related origins, 80% of them may be identified on the problem node/link or the adjacent nodes and 98% of them may be identified within 2 hops network distance (reference to RFC 5714—IP Fast Reroute Framework).

In some embodiments, network health may be described with respect to data traffic behavior. Typically, node health (based on traffic) may be hard to be measured due to the complexity of unicast, broadcast and multicast traffic. In some embodiments of the current invention, node health may be measured by considering the network links. In further embodiments, link health may be measured by two endpoints of behavior, such as traffic, i.e. if(In/Out)UcastPkts, if(In/Out)NUcastPkts, if(In/Out)Discards, if(In/Out)Errors) defined in RFC1213-MIB may be computed as traffic and the quality. In some embodiments, QoS metrics may be used to improve the quality of health indication.

In other embodiments, node health may be measured based on connected links' health with local resource performance metrics, i.e. CPU, Memory. In further embodiments of the current invention, the network health data may be assisted by navigating through topological data or using networking runtime tools to correlate problems to network elements or adjacent domain (e.g., storage, server) elements. As well, network performance analysis of node/link hotspots may be performed.

Link and Node Health

In an embodiment, the rate of transfers and node resource health may be used as metrics for determining the health of a network. In an embodiment, link health indicator, or the health between two nodes of a network may be given by the following equation:

$$\text{Indicator}_{e_{a \to z}}(e) = \begin{cases} 0: & \text{when } f_e \leq \sigma_e \\ 1: & \text{otherwise} \end{cases},$$

$$f_{e_{a \to z}}(m_{1_{e_{a}out}}, m_{1_{e_{z}in}}, \ldots) = \frac{m_{1_{e_{a}out}} + m_{1_{e_{z}in}} + \ldots}{\lambda_{e_{a \to z}}},$$

$$\lambda_e = \lambda_{e_{a \to z}} + \lambda_{e_{z \to a}},$$

-continued e.g., where $m_{1_{e_a out}}$ represents *ifOutDiscards* for endpoint a of link, $m_{1_{e_z in}}$ represents *ifInDiscards* for endpoint z of link e In the equation above, $\lambda_e$ stands for traffic on the link e, a and z stand for the endpoints of the link e, → stands for the traffic flow on the link e. The indicator of health of the link(e) from origin a to end point z is either 1, indicating the link is unhealthy such that traffic is not ok, or 0 indicating that traffic across the link is ok. Traffic may be ok when a link function is less than or equal to standard deviation function σ for that link. σ may be defined as the behavior of a collected metric over a period of time. The behavior may be viewed as variance while collecting data at different time for different elapsed time period. The link function may be based on the input drop packets and output drop packets for that link divided by some function for the input and output traffic. σ may be an arbitrary number (e.g., value 0 represents no tolerance of any dropped packets) or computed based on historical collected data. This Indicator function may give the indication of the link health in Boolean format.

In an embodiment, link health indicator may be defined as $$\text{Indicator}(e_i) = \text{Indicator}_{a \to z}(e_i) \lor \text{Indicator}_{z \to a}(e_i),$$

where a and z represent endpoints of link $e_i$, a→z represents a's output+z's input This equation represents an indicator, for a link $e_i$, which corresponds to a combination of both directional traffic of the link.

In an embodiment, node resource health indicator, or the consumption of resources at a node may be given by the following equation:

$$\text{Indicator}(n) = \begin{cases} 0: & \text{when } f_n \leq \sigma_n \\ 1: & \text{otherwise} \end{cases},$$

$$f_n(r_{1_n}, r_{2_n}, \ldots) = r_{1_n} \oplus r_{2_n} \oplus \ldots,$$

where $r_{1_n}$ and $r_{2_n}$ represents CPU and memory utilization for node n

In the above equation, an indication of the health of a node n may result in a Boolean value, 0 or 1, where 0 may indicate that there is no potential performance problem indication for a particular node and 1 may indicate that the node has potential performance problem or may likely be unhealthy. Node health may be more accurately determined not only by its local resource health but also by considering the adjacent links health, as denoted herein.

In some embodiments, 0 may be given when function $f$, applied to node n, is less than or equal to a standard deviation function σ for node n. σ has been described in the link health indicator section. The function $f$ may be based on a number of characteristics of the node, such as CPU utilization and memory utilization are most commonly used. In the above equation, ⊕ may be any logical function to combine the node resources. For example, it may be an OR type combination, an AND type combination, or a weighing function. A typical example is that node resource health is most commonly computed using OR type operation. In some embodiments, node health may be calculated based on the relation between CPU utilization and memory utilization.

Network Health

In certain embodiments, when a link is operational but unhealthy, a health alert may be raised and all traffic going through that link may be labeled as unhealthy traffic. In other embodiments, when a link is not operational, there is no traffic over this link. In further embodiments, if the traffic across the link is not rerouted, then the traffic will be dropped; otherwise, the traffic load may be rerouted to other links on the node or the adjacent nodes. If rerouted traffic causes other link or node to be unhealthy, an alert may be raised. Otherwise, no health alert may be raised if the rerouted traffic does not cause other link or node to become unhealthy. In alternative embodiments, the users may be notified that the link traffic was rerouted based on behavior change from historical metric analysis (dynamic baseline).

In further embodiments, if traffic gets dropped, i.e. the data that was to be transmitted across a link was lost; the packet drop may appear on incoming endpoint of the traffic on this node. In certain embodiments, this drop of traffic may make the incoming traffic unhealthy for both nodes of this non-operational link. In some embodiments, the traffic outgoing link down may be used to explain the unhealthy traffic incoming link on the node. In further embodiments, the route may be probed to determine if there is more than one down link. For example, if multiple links are unhealthy and the node itself is in high resource utilization, then there may be an unhealthy node and all traffic going through this node may be labeled as unhealthy traffic.

In some embodiments, if a node is down, then there may be no traffic going through this node. In other embodiments, if traffic was re-routed around this node and the re-routing did not cause any unhealthy links or nodes, the network may still be considered to be healthy. In other embodiments, if re-routed traffic cause links or nodes to be unhealthy, traffic going through an unhealthy node or link may be labeled as troubled traffic. In further embodiments, the down node may explain the unhealthy nodes and links. In other embodiments, if there is no health-related alert raised, dynamic baseline may provide an indication of a behavior change in the network.

In some embodiments, network health may be defined as a function of the health of the links and nodes in the network. In further embodiments, link health indicator may be defined as $$\text{Health}(e_i) = 1 - \frac{\lambda_{e_{i_{a \to z}}} \cdot \text{Indicator}_{a \to z}(e_i) + \lambda_{e_{i_{z \to a}}} \cdot \text{Indicator}_{z \to a}(e_i)}{\lambda_{e_i}},$$

when $\lambda_{e_i} > 0$ $\text{Health}(e_i) = 0$, otherwise

This equation represents an indicator, for a link $e_i$, which corresponds to a combination of both directional traffic of the link. As well, Node health can be defined as:

$$\text{Health}(n) = 1 - \frac{\sum_{e_i}^{e_i \in E_n} \lambda_{e_{i_{z \to a}}} \cdot \text{Indicator}_{z \to a}(e_i) + \lambda_{e_{i_{a \to z}}} \cdot \text{Indicator}_{a \to z}(e_i)}{(\lambda_n =) \sum_{e_i}^{E_n} \lambda_{e_i}},$$

-continued when $\lambda_n > 0$

Health(n)=0, otherwise
which represents a combination of the indicators for each link connected to node n further combined with a measuring of the resource metrics to that node. The overall health of that device may be expressed as 1≥Health(n)≥0, where the closer the health is to 1, the more healthy it is and the closer the health is to 0, the less healthy it is.

Using these equations, the health of the entire network may be given by the equation:

$$\text{Health}(G(N, E)) = \frac{\sum\limits_{e_i}^{e_i \in E} \lambda_{e_i} \cdot (1 - \text{problem}(e_i)) \cdot (1 - \text{problem}(n_{e_{i_a}})) \cdot (1 - \text{problem}(n_{e_{i_z}}))}{\sum\limits_{e_i}^{e_i \in E} \lambda_{e_i}},$$

where G represents the network and consists of |N|nodes and |E| links, $\lambda_{e_i}$ represents the traffic of link $e_i$, As well, the network health may then be expressed as 1≥Health(G(N, E))≥0, where the closer the number is to 1 the healthier the network is and the closer to 0 it is, the less healthy the network is. Problem( ) is defined herein.

Network Performance Problems

Given a determination of utilization of the overall network, it may be desired to determine the nodes or links which are highly utilized and may be used to determine if a problem exists. In some embodiments, link performance problem can be defined as problem (e)⇐ Indicator$_{a \rightarrow z}$(e) ∨ Indicator$_{z \rightarrow a}$(e) and a node performance problem can be defined as problem(n)⇐

$$\text{problem}(n) \Leftarrow \bigvee\limits_{e_i}^{e_i \in |E_n|} \text{problem}(e_i) \wedge \text{Indicator}(n).$$

problem($e_i$)∧Indicator(n).

Take for example a network with domains A, B, C, and D. This network may be found to be unhealthy. That is, there may be an identified problem with the network health. Based on this network health, a domain, such as domain B, may be identified. This domain may be identified to be the cause of the infrastructure problem. Within this domain may be a network, such as network B. In this network, it may be identified that node X and node Y, in conjunction with link Z may be unhealthy. Based on this determination, a determination of the origin of this may be made.

Figure 3:
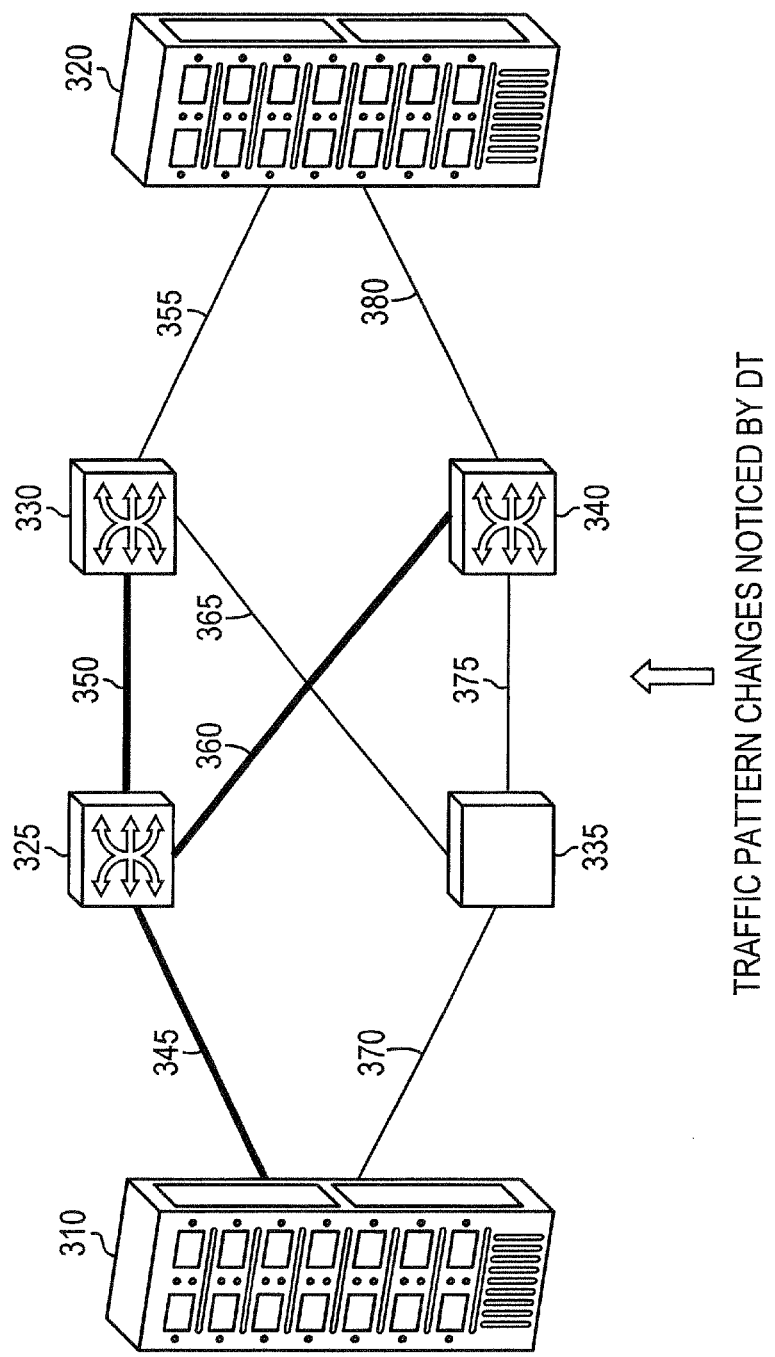
FIG. 3 shows an embodiment of a simplified network of the current invention noting a non-functioning node.

Refer to the embodiment of FIG. 3. In this embodiment, node 325 may be have crashed. In this embodiment, other nodes and links may be impacted but may still be functioning. However, as long as packets are moving through the network without problems, i.e. the traffic is re-routed through other nodes and links, the network may be stable and the network may be considered healthy. Yet, dynamic baseline may be violated and a few performance exceptions may be noted.

Figure 4:
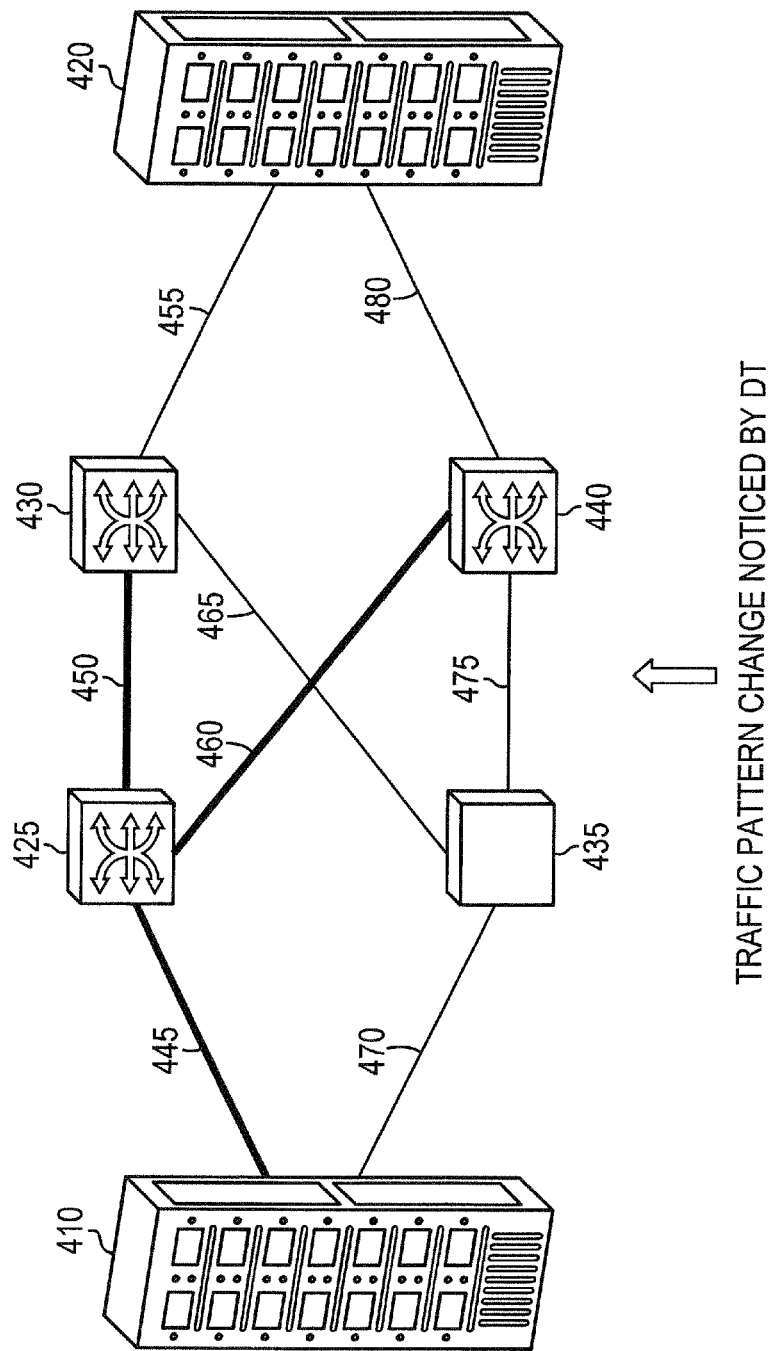
FIG. 4 shows an embodiment of a simplified network of the current invention noting a non-functioning link.

Refer to the embodiment of FIG. 4. In this embodiment, node 425 may have crashed. In this embodiment, other nodes and links may be impacted. In the embodiment of FIG. 4, traffic may be rerouted to alternative paths; however this may occur with some packet drops (HT). The links with the problem traffic may be detected and the health of the network will be downgraded. As well, dynamic baseline may be violated and a few performance exceptions may be noted.

Figure 5:
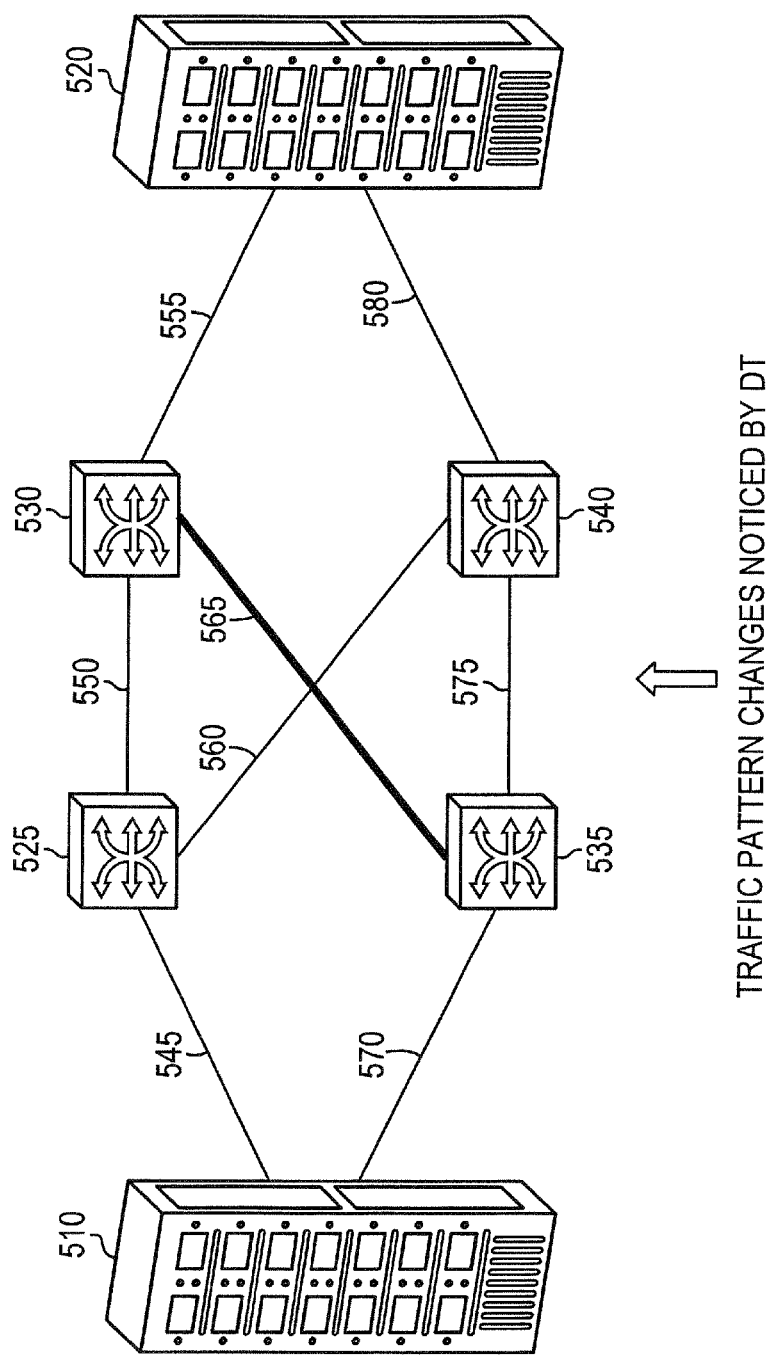
FIG. 5 shows an alternative embodiment of a simplified network of the current invention noting a non-functioning link.

For example, refer to the embodiment of FIG. 5. In this Figure, link 580 may be down. The down link 580 may not transmit network traffic. This may result in node 530 expending resources to either re-route traffic or determine if link 580 is down. In this embodiment, if the traffic is being re-routed without problem, the network is functioning correctly and may be denoted as being healthy. However, dynamic baseline may be violated and a few performance exceptions may be noted.

Figure 6:
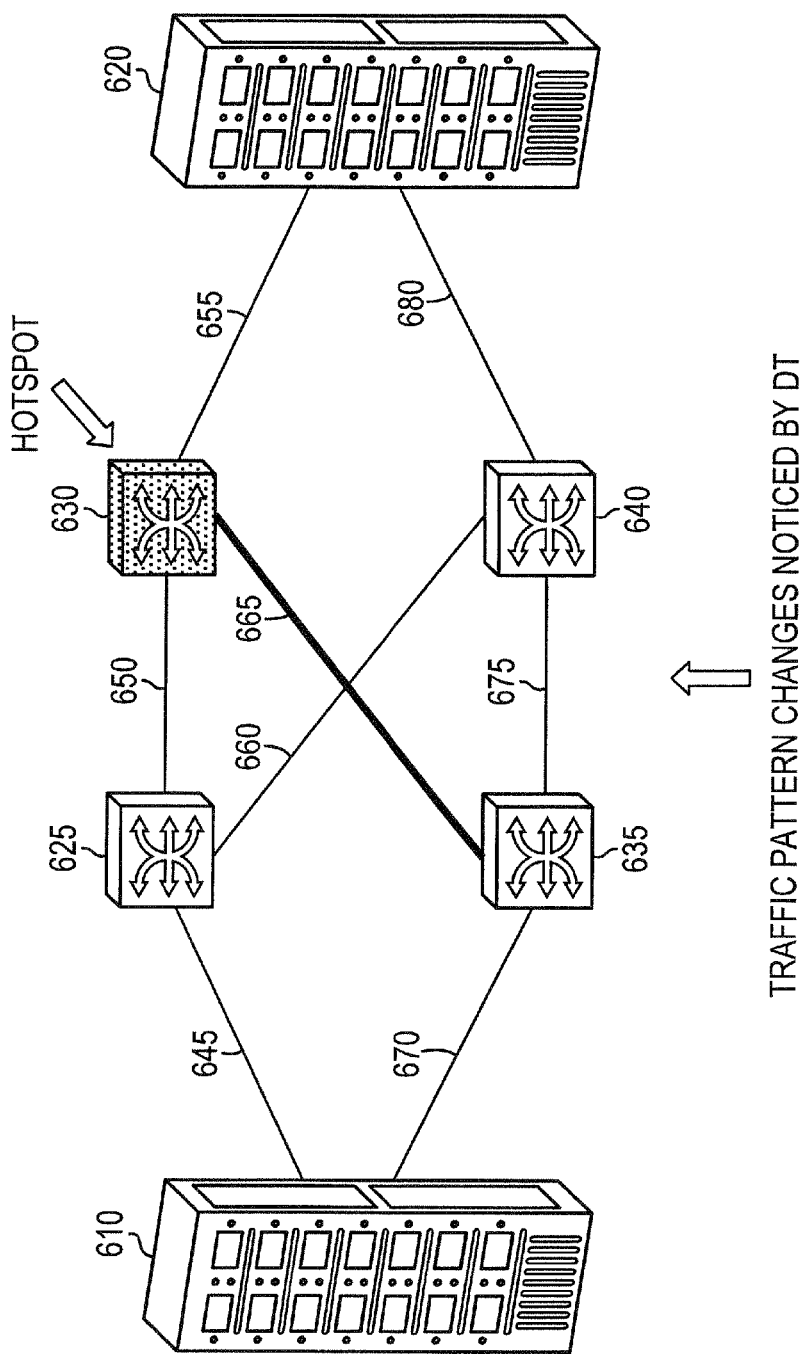
FIG. 6 shows an alternative embodiment of a simplified network of the current invention.
Figure 7:
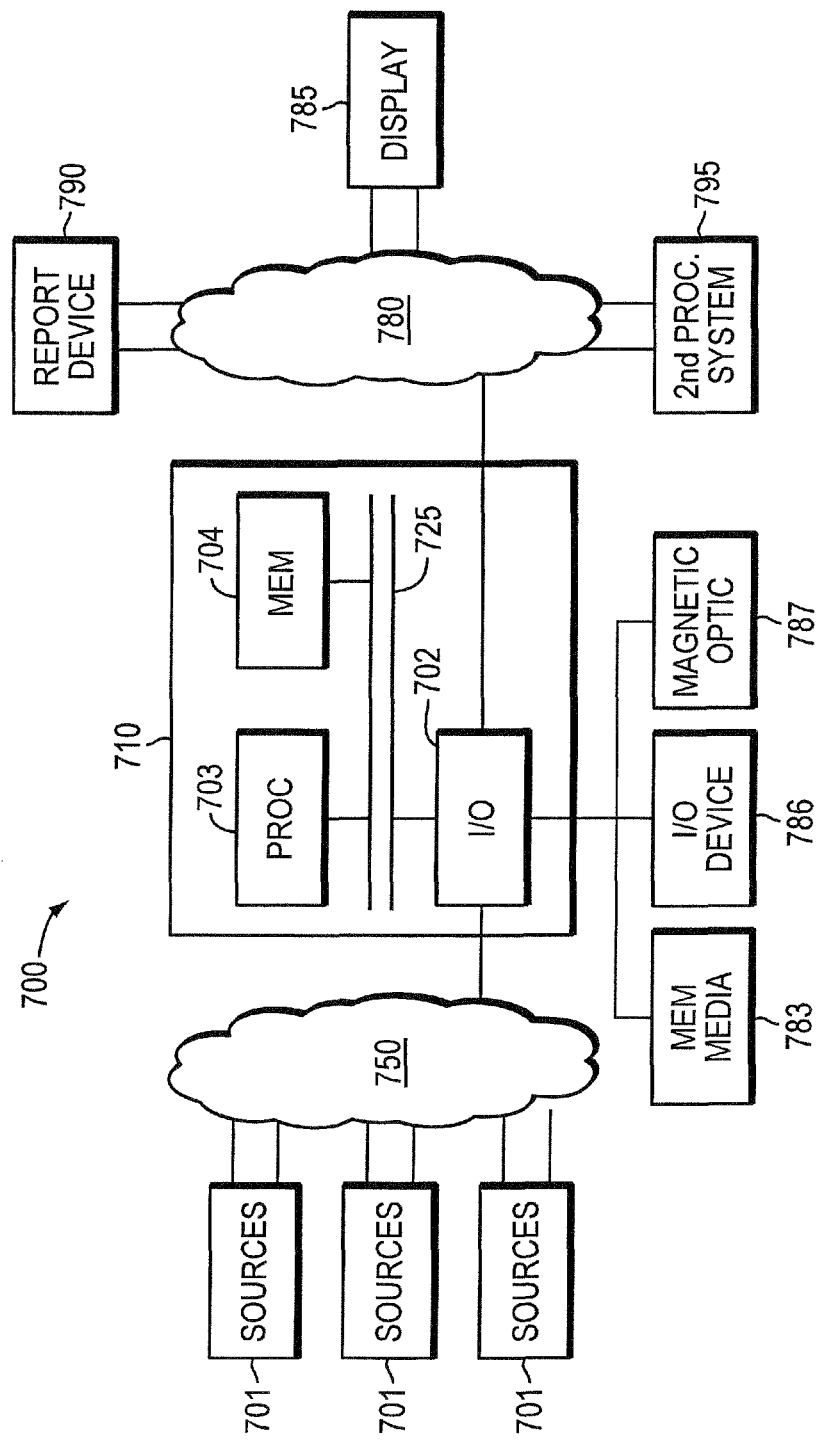
FIG. 7 shows an embodiment of an embodiment of the current invention as loaded on a computer.
Figure 8:
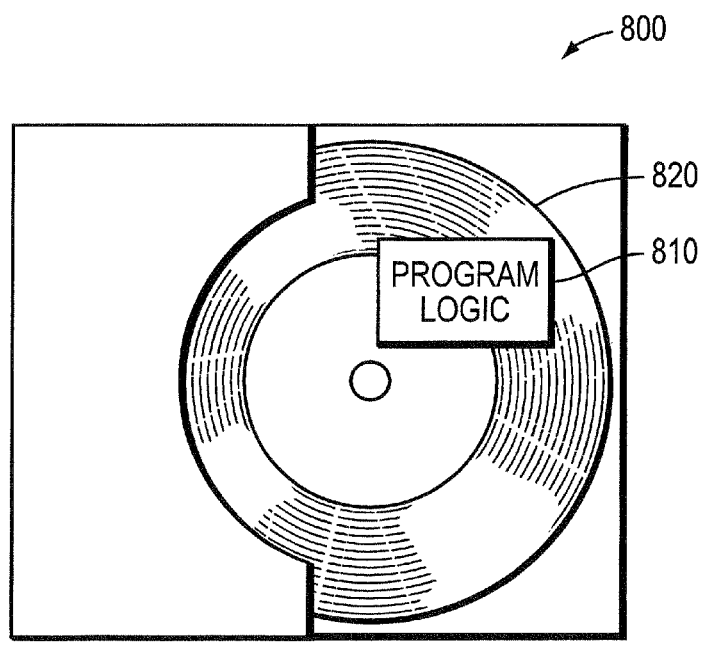
FIG. 8 shows an embodiment of a method of the current invention embodied as program code or a program product.

For example, refer to the embodiment of FIG. 6. In this Figure, link 680 may be down. The down link 680 may not transmit network traffic. This may result in node 630 expending resources to re-route traffic. In this embodiment, if the traffic is not being re-routed without problems, as node 630 or links 655 and 665 are not able to handle the additional traffic. In some embodiments, CPU and memory utilization on the rerouted node may become too high and packets may be dropped. In this embodiment, the network health may be denoted as less than optimal and a hot spot may be identified. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 8 shows Program Logic 810 embodied on a computer-readable medium 830 as shown, and wherein the Logic is encoded in computer-executable code configured for carrying out the reservation service process of this invention and thereby forming a Computer Program Product 800.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for analyzing a computer network comprising one or more domains, each of the one or more domains comprising a plurality of nodes and one or more links, the method comprising:
   calculating health of the computer network based on the data traffic in links and nodes of the network;
   determining, based on the computer network health, if an infrastructure problem exists;
   identifying, based on the determination, a domain of the one or more domains of the computer network;
   further identifying, based on the identified domain, an infrastructure problem selected from the group comprising the plurality of nodes and the one or more links of the identified domain;
   determining an origin of the cause of the infrastructure problem based on the identified infrastructure problem.

2. The method of claim 1 where in the calculation of the health of the computer network comprises determining a health for each link of the one or more links.

3. The method of claim 2 where in the calculation of the health of the computer network comprises determining a health for each node the plurality of nodes.

4. The method of claim 3 wherein the health of a node is determined by the function:
   Health(n); wherein Health(n) is given by the equation $$\text{Health}(n) = 1 - \frac{\sum_{e_i}^{e_i \in E_n} \lambda_{e_{i_{z \to a}}} \cdot \text{Indicator}_{z \to a}(e_i) + \lambda_{e_{i_{a \to z}}} \cdot \text{Indicator}_{a \to z}(e_i)}{(\lambda_n =) \sum_{e_i}^{E_n} \lambda_{e_i}},$$

when $\lambda_n > 0$.

Health(n)=0, otherwise.

5. The method of claim 1 wherein the health of the network is given by the function Health(G(N, E)); wherein Health(G(N, E)) is given by the following equation:

$$\frac{\sum_{e_i}^{e_i \in E} \lambda_{e_i} \cdot (1 - \text{problem}(e_i)) \cdot (1 - \text{problem}(n_{e_{i_a}})) \cdot (1 - \text{problem}(n_{e_{i_z}}))}{\sum_{e_i}^{e_i \in E} \lambda_{e_i}}.$$

6. A system for analyzing a computer network the data system comprising:
   one or more domains, each of the one or more domains comprising a plurality of nodes and one or more links; and
   computer-executable program code operating in memory, wherein the computer-executable program code is configured for execution of the following steps:
   calculating health of the computer network based on the data traffic in links and nodes of the network;
   determining, based on the computer network health, if an infrastructure problem exists;
   identifying, based on the determination, a domain of the one or more domains of the computer network;
   further identifying, based on the identified domain, an infrastructure problem selected from the group comprising the plurality of nodes and the one or more links of the identified domain;
   determining an origin of the cause of the infrastructure problem based on the identified infrastructure problem.

7. The system of claim 6 where in the calculation of the health of the computer network comprises determining a health for each link of the one or more links.

8. The system of claim 7 where in the calculation of the health of the computer network comprises determining a health for each node the plurality of nodes.

9. The system of claim 8 wherein the health of a node is determined by the function:
   Health(n); wherein Health(n) is given by the equation $$\text{Health}(n) = 1 - \frac{\sum_{e_i}^{e_i \in E_n} \lambda_{e_{i_{z \to a}}} \cdot \text{Indicator}_{z \to a}(e_i) + \lambda_{e_{i_{a \to z}}} \cdot \text{Indicator}_{a \to z}(e_i)}{(\lambda_n =) \sum_{e_i}^{E_n} \lambda_{e_i}},$$

when $\lambda_n > 0$.

Health(n)=0, otherwise.

10. The system of claim 6 wherein the health of the network is given by the function Health(G(N, E)); wherein Health(G(N, E)) is given by the following equation:

$$\frac{\sum_{e_i}^{e_i \in E} \lambda_{e_i} \cdot (1 - \text{problem}(e_i)) \cdot (1 - \text{problem}(n_{e_{i_a}})) \cdot (1 - \text{problem}(n_{e_{i_z}}))}{\sum_{e_i}^{e_i \in E} \lambda_{e_i}}.$$

11. A program product for analyzing a computer network comprising one or more domains, each of the one or more domains comprising a plurality of nodes and one or more links, the program product comprising:
   a non-transitory computer-readable storage medium encoded with computer-executable program code enabling:
   calculating health of the computer network based on the data traffic in links and nodes of the network;
   determining, based on the computer network health, if an infrastructure problem exists;
   identifying, based on the determination, a domain of the one or more domains of the computer network;
   further identifying, based on the identified domain, an infrastructure problem selected from the group comprising the plurality of nodes and the one or more links of the identified domain;
   determining an origin of the cause of the infrastructure problem based on the identified infrastructure problem.

12. The computer program product of claim 11 where in the calculation of the health of the computer network comprises determining a health for each link of the one or more links.

13. The computer program product of claim 12 where in the calculation of the health of the computer network comprises determining a health for each node the plurality of nodes.

14. The computer program product of claim 13 wherein the health of a node is determined by the function Health(n); wherein Health(n) is given by the equation $$\text{Health}(n) = 1 - \frac{\sum_{e_i}^{e_i \in E_n} \lambda_{e_{i_{z \to a}}} \cdot \text{Indicator}_{z \to a}(e_i) + \lambda_{e_{i_{a \to z}}} \cdot \text{Indicator}_{a \to z}(e_i)}{(\lambda_n =) \sum_{e_i}^{E_n} \lambda_{e_i}},$$

when $\lambda_n > 0$.

Health(n)=0, otherwise.

15. The computer program product of claim 11 wherein the health of the network is given by the function Health(G(N, E)); wherein Health(G(N, E)) is given by the following equation:

$$\frac{\sum_{e_i}^{e_i \in E} \lambda_{e_i} \cdot (1 - \text{problem}(e_i)) \cdot (1 - \text{problem}(n_{e_{i_a}})) \cdot (1 - \text{problem}(n_{e_{i_z}}))}{\sum_{e_i}^{e_i \in E} \lambda_{e_i}}.$$

16. The computer program product of claim 10 wherein the health of a node is given by the following equation:

$$\text{Indicator}(n) = \begin{cases} 0: & \text{when } f_n \le \sigma_n \\ 1: & \text{otherwise} \end{cases},$$

$$f_n(r_{1_n}, r_{2_n}, \ldots) = r_{1_n} \oplus r_{2_n} \oplus \ldots,$$

where $r_{1_n}$ and $r_{2_n}$ represents CPU and memory utilization for node $n$.

17. The computer program product of claim 10 wherein the health of a link is given by the following equation:

$$\text{Indicator}(e_i) = \text{Indicator}_{a \to z}(e_i) \lor \text{Indicator}_{z \to a}(e_i),$$

where a and z represent endpoints of link $e_i$, a→z represents a's output+z's input.

18. The computer program product of claim 10 wherein the network health accounts for non-failure problems of the links and nodes in the network, the non-failure problems comprising performance of the links and nodes.

19. The computer program product of claim 10 wherein the link health is given by the following equation:

$$\text{Health}(e_i) = 1 - \frac{\lambda_{e_{i_{a \to z}}} \cdot \text{Indicator}_{a \to z}(e_i) + \lambda_{e_{i_{z \to a}}} \cdot \text{Indicator}_{z \to a}(e_i)}{\lambda_{e_i}},$$

when $\lambda_{e_i} > 0$

Health(e)=0, otherwise.

20. The method of claim 1 wherein the network health accounts for non-failure problems of the links and nodes in the network, the non-failure problems comprising performance of the links and nodes.

* * * * *